United States Patent
Crump et al.

(10) Patent No.: US 6,900,276 B2
(45) Date of Patent: May 31, 2005

(54) LOW VOC VINYLESTER RESIN AND APPLICATIONS

(75) Inventors: L. Scott Crump, Gladstone, MO (US); Ming Yang Zhao, Kansas City, MO (US)

(73) Assignee: Cook Composites & Polymers Co., North Kansas City, MO (US)

( * ) Notice: Subject to any disclaimer, the term of this patent is extended or adjusted under 35 U.S.C. 154(b) by 107 days.

(21) Appl. No.: 10/061,686

(22) Filed: Feb. 1, 2002

(65) Prior Publication Data

US 2003/0153718 A1 Aug. 14, 2003

(51) Int. Cl.$^7$ .......................... C08G 59/17; C08L 63/10
(52) U.S. Cl. ...................... 525/531; 525/530; 525/112; 525/115
(58) Field of Search .................. 525/530, 531; 528/112, 115

(56) References Cited

U.S. PATENT DOCUMENTS

| | | | |
|---|---|---|---|
| 2,934,506 A | 4/1960 | Hicks et al. | 260/15 |
| 3,564,074 A | 2/1971 | Avallone | 260/837 |
| 3,632,861 A | 1/1972 | Hargis | 260/837 |
| 3,773,856 A | 11/1973 | Takiyama et al. | 260/836 |
| 4,824,919 A * | 4/1989 | Baker et al. | 525/502 |
| 4,861,832 A * | 8/1989 | Walsh | 525/113 |
| 5,106,924 A * | 4/1992 | Smith et al. | 525/530 |

FOREIGN PATENT DOCUMENTS

| | | | | |
|---|---|---|---|---|
| GB | 1139100 | | 1/1969 | |
| JP | 09077843 | | 3/1997 | |
| JP | 2000199076 A | * | 7/2000 | C23C/22/53 |

* cited by examiner

Primary Examiner—Robert Sellers
(74) Attorney, Agent, or Firm—Whyte Hirschboeck Dudek SC (57) ABSTRACT

A low viscosity (and therefore low VOC) resin can be produced by limiting the molar ratio of the reactants, especially the dicarboxylic acid compound, used in the reaction. Specifically, reacting a reaction mixture comprising (i) one mole of a diepoxide having at least two glycidyl ether type epoxy groups; (ii) 0.5 to 2.0 moles of an unsaturated monocarboxylic acid; (iii) 0.1 to 0.5, preferably 0.1 to 0.3, moles of maleic anhydride; and, (iv) water, until substantially all of the epoxy groups disappear leads to the formation of a resin with a high shear (at least 500 s$^{-1}$) viscosity of less than 1200 cP when measured in a 70% NVM (non-volatile matter) styrene solution. The resin may be used in barrier coatings, gel coatings, skin coatings and as a laminate resin.

7 Claims, 6 Drawing Sheets

LOW VOC VINYLESTER RESIN AND APPLICATIONS

FIELD OF THE INVENTION

The present invention is directed to low VOC resins, more particularly, low VOC maleated vinylester resins and uses thereof.

BACKGROUND OF THE INVENTION

Modified vinylester resins are becoming more common for many applications. Maleic anhydride and maleic acid modified vinylesters have been reported. For example, U.S. Pat. No. 3,632,861 discloses that improved heat distortion temperatures are obtained from vinylester resins prepared from an unsaturated dicarboxylic acid half ester of a hydroxyalkyl acrylate which is reactive with a polyepoxide or a melamine resin. The improvement results from isomerizing at least about 30 mole percent of the half ester to the trans form before reaction with the polyepoxide.

Also, U.S. Pat. No. 3,773,856 discloses a process for preparing an unsaturated epoxy ester resin composition which can be cured by the addition of an organic peroxide and an accelerator even at room temperature, the process comprising heat reacting an epoxy component selected from the epoxy compounds having at least one glycidyl ether type epoxy group in their molecular structure, with a first acid component from the group consisting of the polymerizable unsaturated monobasic acids of 2–8 carbon atoms and a second acid component selected from the group consisting of the saturated monobasic acids, saturated polybasic acids, saturated polybasic acid anhydrides, polymerizable unsaturated polybasic acids and polymerizable unsaturated polybasic acid anhydrides, in the presence of a polymerization inhibitor and an esterification catalyst in an atmosphere of air or molecular oxygen.

Japanese Patent JP 09077843 82 discloses the manufacture of vinylesters by isomerization of maleic acid to fumaric acid at low temperature. These esters are manufactured by (A) treatment of epoxy compounds with unsaturated monobasic acids, ring-opening addition of maleic anhydride (I) to the OH of the resulting vinylesters, and conversion of the maleic acid (II) residues to fumeric acid (III) residues at a low temperature, or by (B) ring-opening addition of (I) to glycols, conversion of (II) residues in the resulting acid-terminated unsaturated polyesters into (III) residues and a low temperature, and treatment of the terminal acids of the unsaturated polyesters with epoxy compounds and unsaturated monobasic acids.

Great Britain Patent GB 1,139,100 discloses polyhydroxy polyesters, essentially free from unreacted epoxy and $CO_2$ Groups, which were prepared from dicarboxylic acids, ethylenically unsaturated monocarboxylic acids and a diepoxy compound, such as an epoxy resin.

The reaction of maleic anhydride with a secondary hydroxyl group of the vinylester leads to a branched structure, exhibiting high viscosity and the possibility of gelling during production. However, the dependent secondary hydroxyl groups improve the adhesion properties of the resin and increase the number of reactive sites for further modification of the resin.

Maleic acid may lead to a linear resin structure, but it costs more than maleic anhydride and the handling of a powder chemical such as maleic acid is more difficult than melting maleic anhydride. Also, the prior art maleic acid based resins are too high in molecular weight and viscosity to be useful as a low VOC resin.

A hallmark of the current invention is a safer, lower cost process which produces low VOC resins which are predominantly linear in structure.

SUMMARY OF THE INVENTION

One preferred embodiment of the invention comprises a low VOC resin comprising monomers and oligomers of Formula I $$R\text{-}[\text{-}Ep'\text{-}MA'\text{-}]_n\text{-}Ep'\text{-}R \quad (I)$$

where R is, each occurrence, a carboxyl radical, Ep' is a diepoxy radical, MA' is a maleic acid carboxyl radical, n is a non-negative integer, wherein at least about 50 mole percent of the monomers and oligomers are linear and have a value for n of 0 or 1; and up to about 30 weight percent, based on the total weight of the barrier coat, of an organic solvent.

Another embodiment of the invention comprises a low VOC resin comprising the reaction product obtained by reacting a mixture comprising: (i) a diepoxide having at least two glycidyl ether type epoxy groups; (ii) an unsaturated monocarboxylic acid; (iii) maleic anhydride; and, (iv) water, until substantially all of the epoxy groups react wherein the molar ratio of diepoxide: unsaturated monocarboxylic acid: maleic anhydride is 1:0.5 to 2.0:0.1 to 0.5, respectively; and up to 30 percent by weight of an organic solvent, based on the weight of the total barrier coat.

Another embodiment of the invention includes a process for making a low VOC resin, the process comprising the step of reacting a mixture comprising: (i) a diepoxide having at least two glycidyl ether type epoxy groups; (ii) an unsaturated monocarboxylic acid; (iii) maleic anhydride; and, (iv) water, until substantially all of the epoxy groups react to form a resin, wherein the molar ratio of diepoxide: unsaturated monocarboxylic acid: maleic anhydride is 1:0.5 to 2.0:0.1 to 0.5, respectively.

The invention includes the use of the inventive resin in barrier coats, gel coats, skin coats and laminates.

BRIEF DESCRIPTION OF THE DRAWINGS

Preferred embodiments of the invention are described below with reference to the following accompanying drawings, which are for illustrative purposes only.

DETAILED DESCRIPTION

In the composite industry, low VOC resins are generally considered to be resins dissolved in 35% or less of styrene or another reactive monomer such as methyl methacrylate (MMA). Conventional resins are dissolved in 35–50% styrene or other reactive monomers. However, a conventional resin may not be made into a low VOC barrier coat merely by increasing the concentration of non-volatile matter (NVM) because the increased concentration would unacceptably increase the solution viscosity. For example, a barrier coat solution is typically applied by spraying in order to obtain the best results. For practical reasons, such a barrier coat solution should be no more than about 1200 cP (1.2 Pa-s) to obtain acceptable spray characteristics with conventional spraying equipment. As such, the backbone of the barrier coat must be reformulated by changing polymer, monomer and fillers.

The inventors have now found that a low viscosity (and therefore low VOC) resin can be produced by limiting the molar ratio of the reactants, especially the dicarboxylic acid compound, used in the reaction. Specifically, reacting a reaction mixture comprising: (i) one mole of a diepoxide having at least two glycidyl ether type epoxy groups; (ii) 0.5 to 2.0 moles of an unsaturated monocarboxylic acid; (iii) 0.1 to 0.5, preferably 0.1 to 0.3, moles of maleic anhydride; and, (iv) water, until substantially all of the epoxy groups disappear leads to the formation of a resin with a high shear (at least 500 s$^{-1}$) viscosity of less than 1200 cP when measured in a 70% (non-volatile matter) NVM styrene solution.

The inventive barrier coats, gel coats, skin coats and laminating resins comprise a vinylester resin derived from at least two reactants, one of which is maleic anhydride and the other is a diepoxide. The vinylester resin is characterized by a high shear (at least 500 s$^{-1}$) viscosity in styrene solution, at a concentration of 70% non-volatile matter (NVM), less than or equal to about 1200 cP (1.2 Pa-s) and is composed of at least about 50% linear monomers or dimers.

Figure 1:
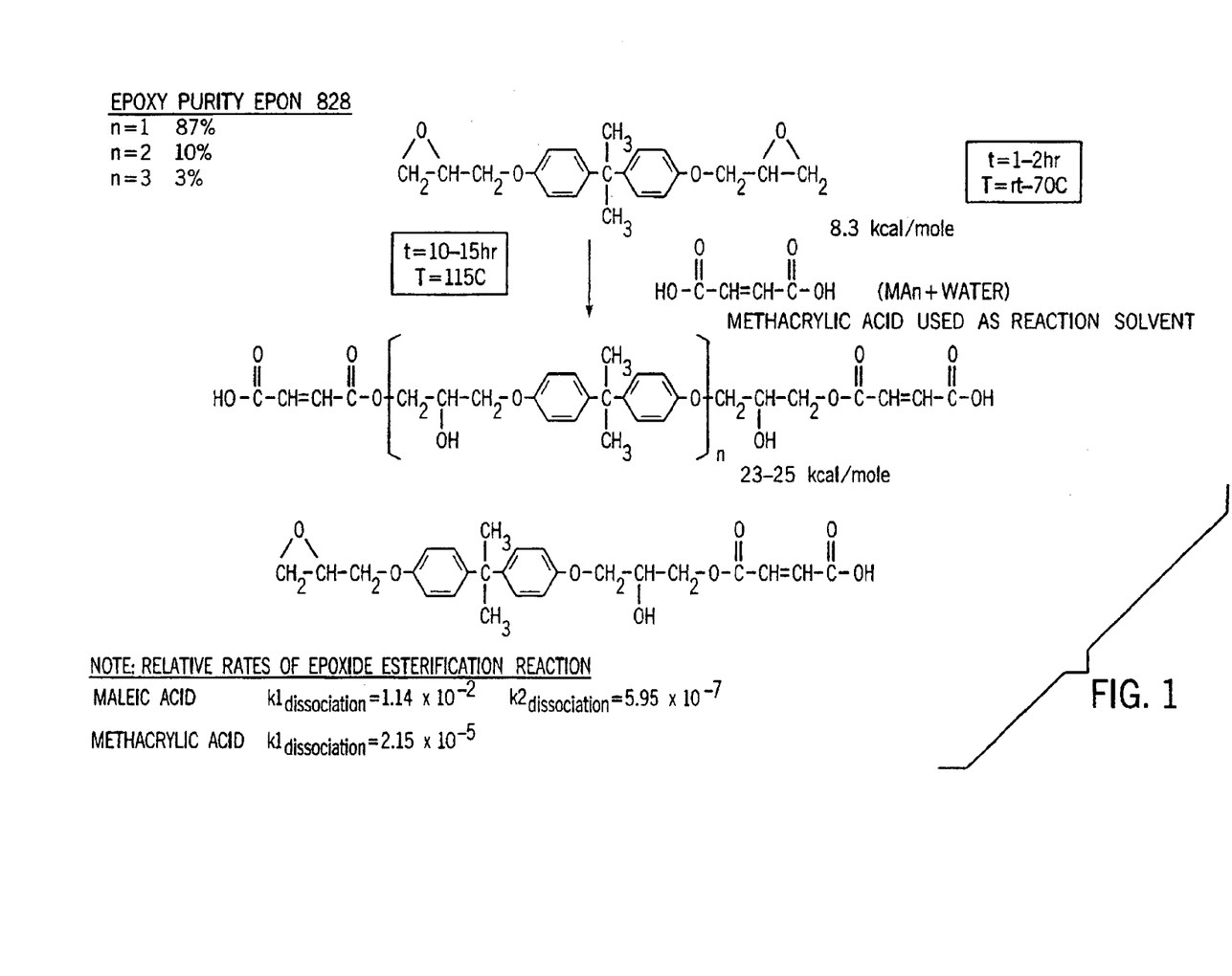
FIG. 1 shows a reaction sequence for synthesizing the inventive resin.

FIG. 1 shows a preferred embodiment of the synthesis of the new vinylester resin of the current invention. A diepoxy, also called herein an "epoxy," is reacted with maleic acid. The maleic acid is formed in situ from maleic anhydride. Maleic anhydride reacts with water to form maleic acid which can then further react with the epoxy. The reaction generally forms a linear reaction product (I):

R-[-Ep'-MA'-]$_n$-Ep'-R     (I)

where R is, each occurrence, a carboxyl radical or hydroxyl group, Ep' is a diepoxy residual group, MA' is a maleic acid carboxyl residual group, and n, the degree of polymerization, is an integer at least equal to 0. The reaction product comprises oligomers with a range of polymerization degrees. Preferably, the reaction product oligomers predominantly have degrees of polymerization of 4 or less, more preferably at least about 70% of the oligomers have degrees of polymerization of 4 or less. Advantageously, about half of the oligomers will have degrees of polymerization of 1 or 2.

The diepoxides usable in this invention have at least two glycidyl ether type epoxy groups. The preferred diepoxide compound of this invention is derived from the reaction of bisphenol-A with an epichlorohydrin. Such diepoxides are commercially available, for example, the EPON series of resins, such as EPON 828, are condensation products of epichlorohydrin and bisphenol-A, are sold by Shell Chemical Company of Houston, Tex. Other diepoxide compounds useful in forming the vinylester resin of the current invention are taught in GB 1,139,100 incorporated herein by reference.

The degree of polymerization is a function of, inter alia, the ratio of the concentration of maleic acid, [MAc], to the concentration of epoxide resin, [EPR], as shown in Formula (II):

n∝[MAc]/[EPR]     (II)

As such, when the concentration of epoxide, [EPR], is much greater than the concentration of maleic acid, [MAc], the degree of polymerization n will be small. Conversely, when the concentration of epoxide, [EPR], is approximately equal to the concentration of maleic acid, [MAc], the degree of polymerization n will be large. In the current invention, the concentration of maleic acid, [MAc], is low compared to the concentration of epoxide, [EPR], because the maleic acid is generated in situ by reacting maleic anhydride which is provided in relatively low concentrations, i.e., less than 50% of the concentration of epoxide. In contrast, prior art processes, such as GB 1,139,100, provide an initial concentration of dicarboxylic acid, such as maleic acid, which is 50 to 90% of the concentration of the epoxide.

Figure 2A:
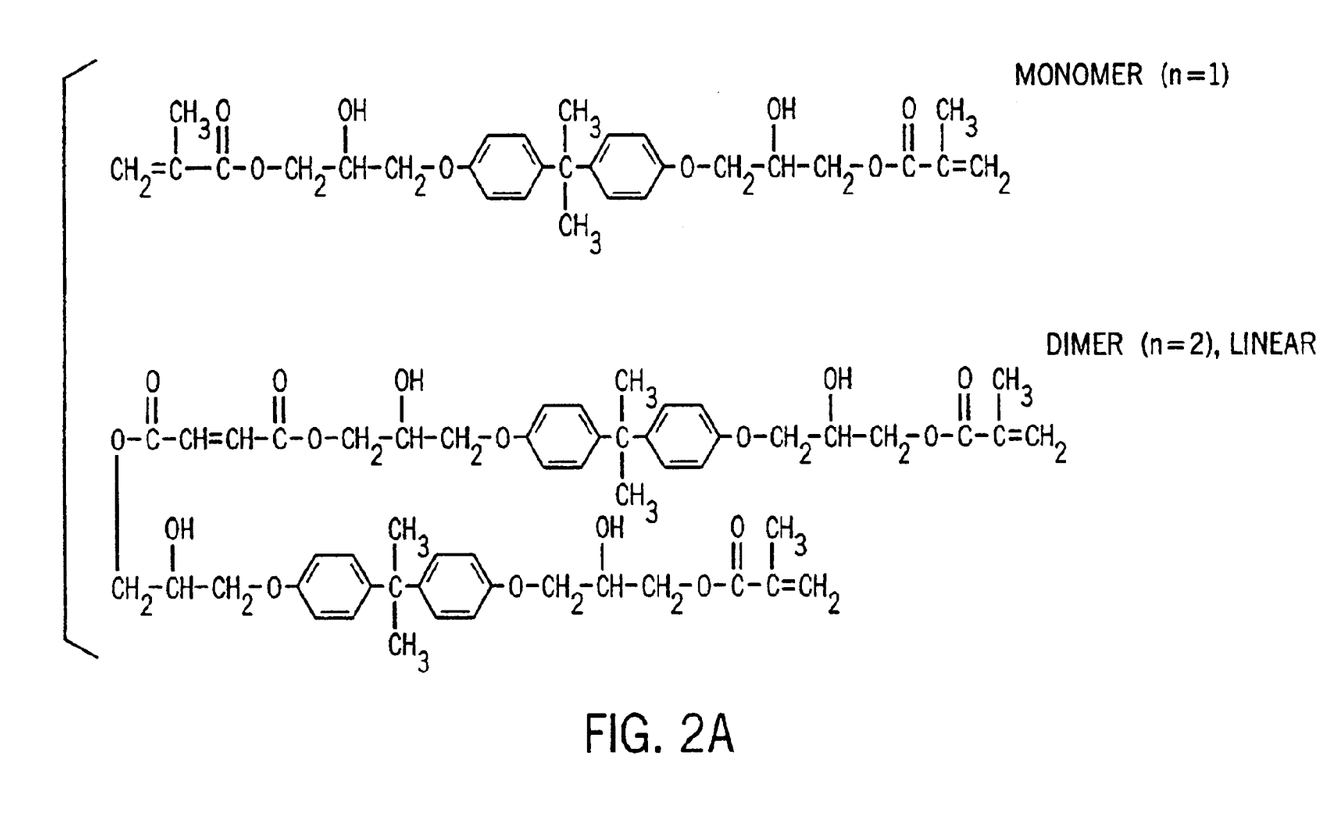
FIGS. 2A and 2B shows linear end-capped oligomers of the inventive resin.
Figure 2B:
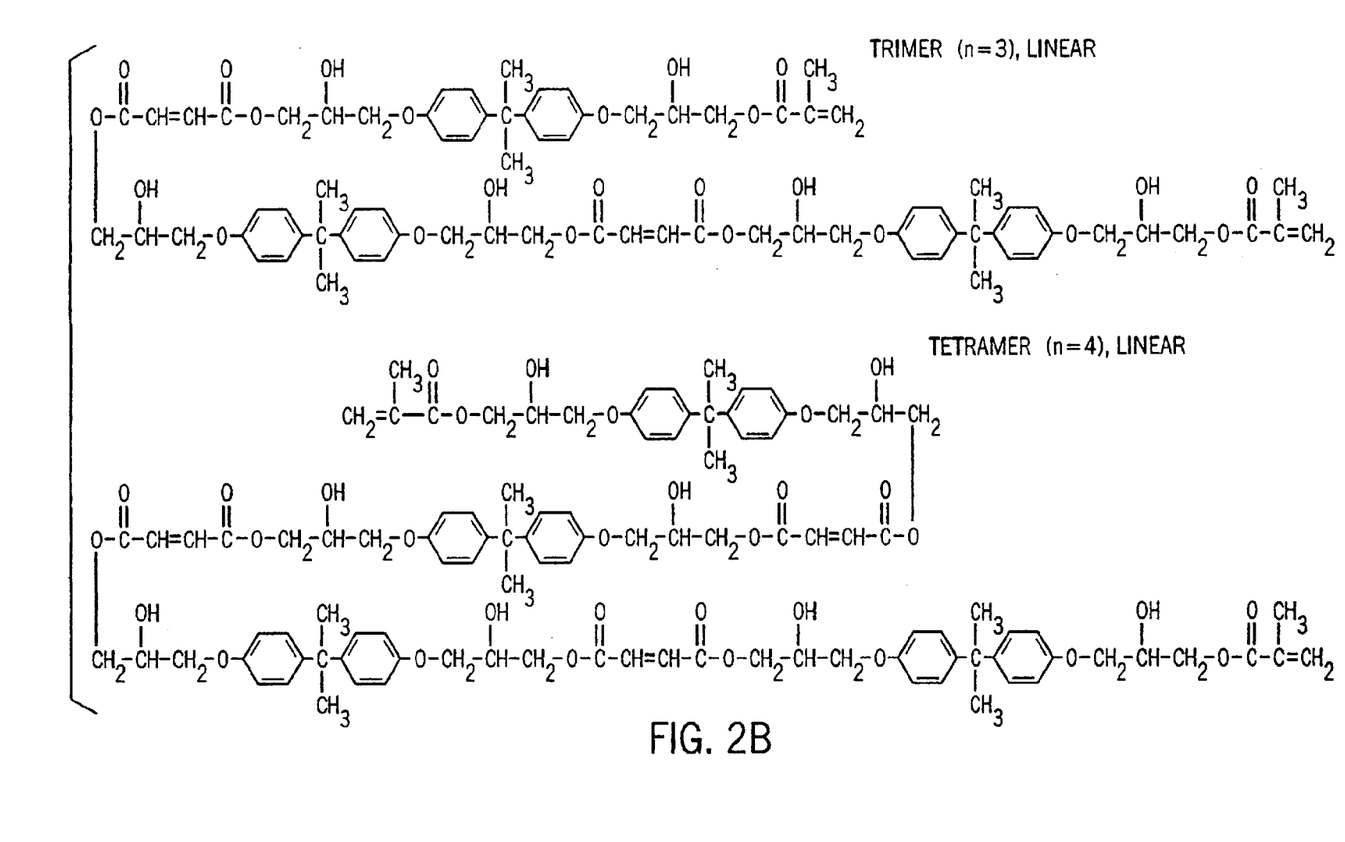

The reaction preferably occurs in an organic solvent that is reactive with the vinylester resin so as to endcap the resin. Typically, such reactive solvents are monocarboxylic acids such as methacrylic acid and acrylic acid, preferably methacrylic acid. The methacrylic acid reaction solvent will react with the reaction product (I) to form end-capped oligomers (as shown in FIGS. 2A and 2B for oligomers with degrees of polymerization of 4 or less). The oligomers shown in FIGS. 2A and 2B have the linear structure preferred in this invention. The general formula for the end-capped oligomers is shown in Formula (III):

MAA-[-Ep'-MA'-]$_n$-Ep'-MAA     (III)

where MAA is a residual group based on methacrylic acid, EP is a residual group based on the diepoxide and n is the degree of polymerization.

Referring again to FIG. 1, an alternate reaction product (IV) of the current inventive synthesis is a molecule with only one ester group because the second epoxide ring did not open. Reaction product (IV) is generally an intermediate and the concentration of reaction product (IV) is therefore determined by the completeness of the ring opening reaction. Preferably, the concentration of reaction product (IV) is small in comparison with the concentration of reaction product (I).

Figure 3A:
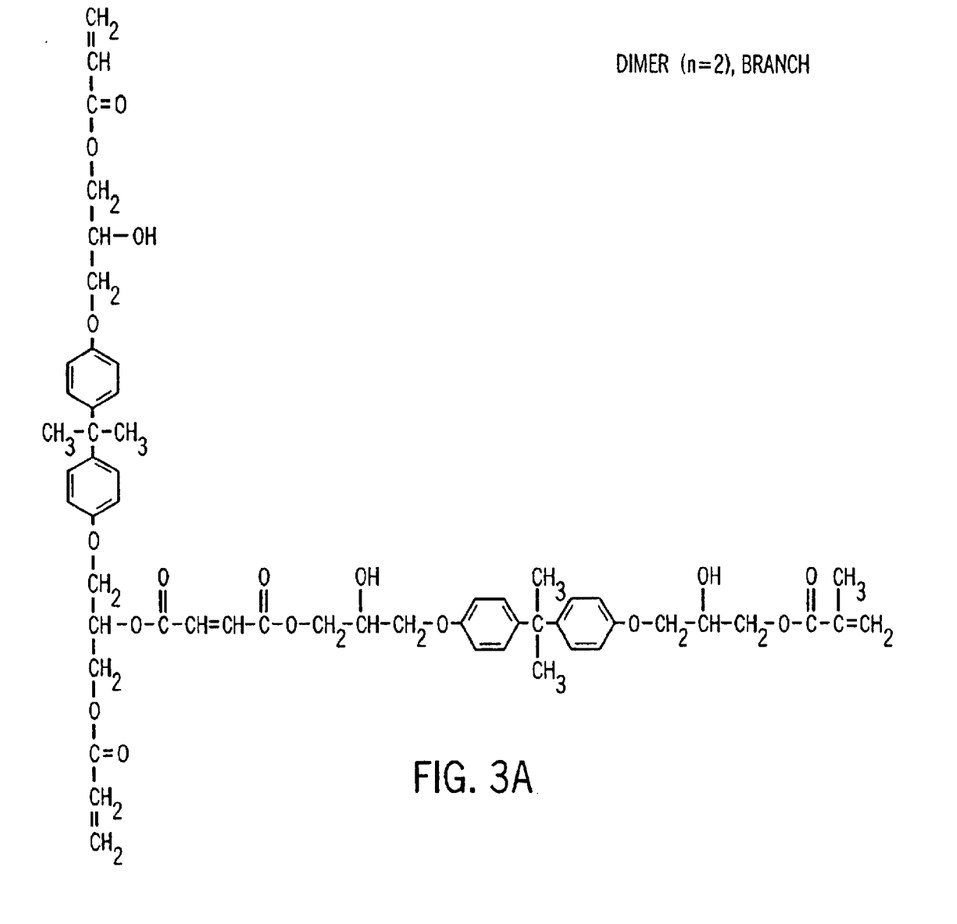
FIGS. 3A and 3B shows branched vinyl esters.
Figure 3B:
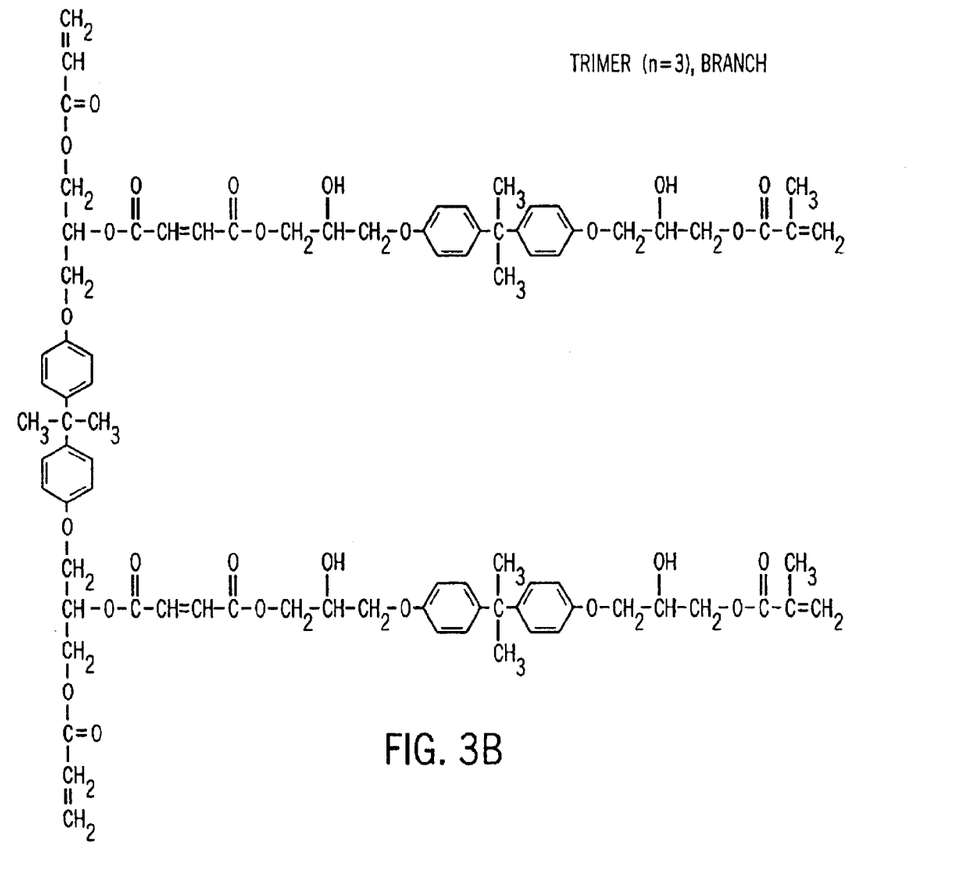

Maleic anhydride can also react with a secondary hydroxyl such as provided by ring-opening of an epoxy group to form a branched vinyl ester as shown in FIGS. 3A and 3B. Formation of such branched vinyl esters are not preferred in this invention, due both to the increased viscosity of branched versus linear molecular structures and to the increased risk of gellation resulting from the presence of branched structures.

Figure 4:
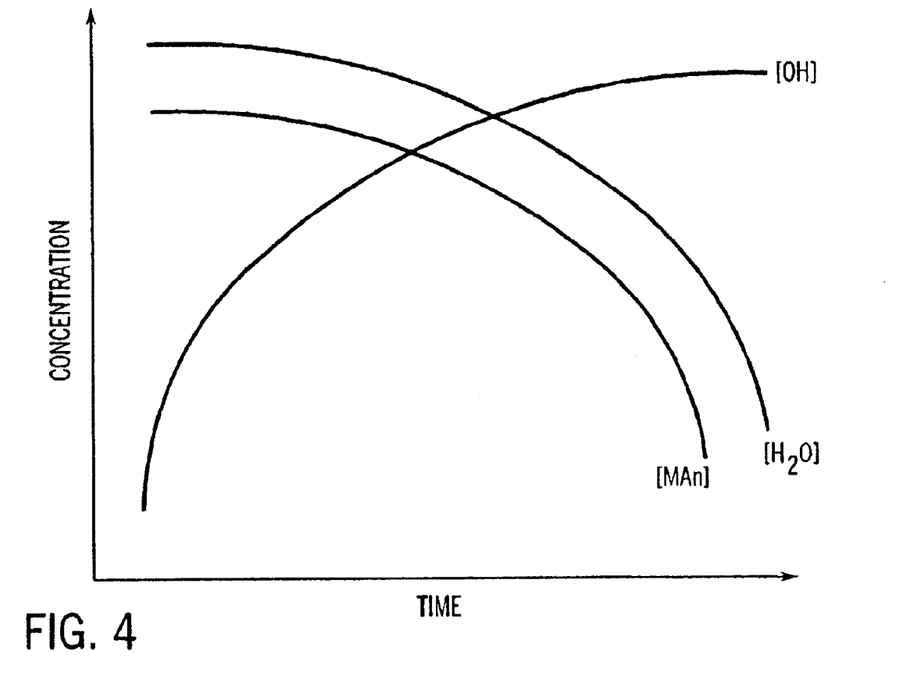
FIG. 4 shows a schematic graph of reactant concentration as a function of reaction time.

However, under the reaction conditions of the current process, the probability of the undesirable branching reaction shown in FIGS. 3A and 3B is very small because at any given time the product of the reactant concentrations is small. The product of the reaction concentrations is [OH][MAn], where [OH] is the molar concentration of secondary hydroxyl groups and [MAn] is the molar concentration of maleic anhydride. The relation between these concentrations is schematically illustrated in FIG. 4 which shows a small (<0.5 M) initial concentration of maleic anhydride and an initial concentration of secondary hydroxyl groups of nearly zero. As the hydroxyl concentration increases over time, the maleic anhydride concentration decrease thus keeping the product of the concentrations small.

EXAMPLES 1 AND 2 AND COMPARATIVE SAMPLE A

Examples 1 and 2 and Comparative Sample A were made according to the formulas shown in Table 1. Comparative Sample A is made in accordance with the teachings of Example 2 of Great Britain Patent 1,139,100.

TABLE 1

Resin Formulas

| Ingredient | Example 1 Weight (g) | Example 1 Molar* Ratio | Example 2 Weight (g) | Example 2 Molar* Ratio | Comp. Sample A Weight (g) | Comp. Sample A Molar* Ratio |
|---|---|---|---|---|---|---|
| Epoxy resin (EPON 828, eew = 186) | 997 (2.68 mol) | 1.0 | 997 (2.68 mol) | 1.0 | 997 (2.68 mol) | 1.0 |
| Maleic anhydride (MW = 98) | 53 (0.54 mol) | 0.20 | 79 (0.81 mol) | 0.30 | 0 | 0 |
| Maleic Acid (MW = 116) | 0 | 0 | 0 | 0 | 156 (1.34 mol) | 0.5 |
| Methacrylic acid (MW = 86) | 371 (4.31 mol) | 1.61 | 323 (3.76 mol) | 1.40 | 231 (2.68 mol) | 1.0 |
| Water | 10 | | 15 | | 0 | |
| Toluhydroquinone | 0.5 | | 0.5 | | 0.5 | |
| Benzyl triethylammonium chloride | 3.2 | | 3.2 | | 3.2 | |
| Viscosity at 70% NVM | 610 cP | | 1170 cP | | 16800 cP | |

*Molar ratio is based on 1 mole of epoxy resin.

The same procedure was used to prepare Examples 1 and 2 and Comparative Sample A. All of the components were charged to a 2L flask equipped with stirrer, thermometer, air sparger and condenser. The mixture was heated to 115° C. in 4 hour and hold to acid value <10 mgKOH/g. The obtained resins were blend with styrene to form a solution containing 30% styrene by weight.

As shown in Table 1, the resins of Examples 1 and 2 have the desired low high shear (at least $500^{s-1}$) viscosity at 70% NVM. In contrast, prior art resins illustrated by Comparative Sample A, have unacceptably high viscosity at 70% NVM at high shear.

EXAMPLE 3 AND COMPARATIVE SAMPLES B–D

The water and weather resistance of a barrier coat made with the inventive resin (Example 3) was compared to two commercial barrier coats and no barrier coat. The barrier coat variables are described in Table 2. Example 3 and Comparative Samples B–D were prepared as follows. A mold, comprising a flat worn-in glass plate was coated with a commercial gel coat. The gel coat was drawn across the mold with a draw down bar set at a gap of 20 mls. This gel coat was cured on the mold. For Example 3 and Comparative Sample C and D a barrier coat was applied on top of the gel coat. The barrier coat was applied over the gel coat by means of a drawn down bar set with a gap of 18 mls. The barrier coat was then cured. Immediately following the curing of the gel coat of Comparative Sample B or the barrier coats of Comparative Sample C, D and Example 3, a laminate was applied over the top of the respective coat. The laminate consisted of a laminating resin 040-4817 which is a dicyclopentadienyl resin and 30% hybon 6,000 fiberglass. Methylethyl ketone peroxide (MEKP) was used as the initiator in the gel coat, barrier coat and laminating resin at levels of 1.8%, 1.8% and 1.25%, respectively. The laminating resin was cured. The coated mold was then allowed to cool and the cured laminate was removed from the mold. The laminates were then immersed in boiling water for 100 hours with the results shown in Table 3. The results of the boiling water test are subjective ratings based on the following guidelines.

As assessment is made of the change to the test laminate including blistering, color, surface profile (fiberprint), cracking and gloss. The change rating will be on a scale of 0.0–5.0 with 5.0 representing extreme change approaching the maximum possible. The reported values will be the average of three independent ratings.

The subjectivity of the ratings can be mitigating by using the guidelines below and considering ratings given to other panels within the test series.

Blistering: The size and density of the blisters determines the severity as shown below.

Blister Ratings

| Typical Rating | Description of Performance |
|---|---|
| 0.0–0.16 | A single blister about 1/16th in. diameter |
| 0.0–0.66 | Low profile distortion. See warning below |
| 0.5–1.0 | Numerous pinhead size blisters only. |
| 1.5–2.0 | Scattered medium sized, undefined, blisters. |
| 1.5–2.0 | Scattered small sized, defined, blisters. |
| 2.0–3.0 | Medium sized, defined, blisters. |
| 3.0–3.66 | Medium sized blisters cover half of test surface. |
| 3.0–4.0 | Medium sized blisters more defined than above. |
| 3.8–4.5 | Small-medium blisters densely populated. Fails. |
| 4.3–5.0 | Densely populated with small, defined blisters. Fails |
| 4.8–5.0 | More densely covered with previous rating. Fails |

Color change: Whites tend to discolor yellow. Colors tend to become lighter.

Surface Profile: The primary cause for profile is the post cure of the composite binders around the non-shrinking glass fibers. Other composition materials may be a factor, however it is still related to shrinkage. Shrinkage will occur across the panel during the test due to heat transfer from the heated (boiling) water. The rating should reflect the difference between the area exposed to water and the area outside. Fiberprint is best observed when holding the panel as to get shadows behind the room lighting and define the profile. In the severe cases (approaching maximum) the surface profile is observed without the trick of lighting angles. At times, due to excessive blistering, surface profile can not be rated.

Cracking: Cracks are most obvious when stretching across longer areas or when centered through the dome of a blister. Most cracking occurs around the perimeter of a blister.

Cracking Ratings

| Typical Rating | Description of Performance |
| --- | --- |
| 0.5–1.0 | Several are perimeter oriented. A couple are domed. |
| 1.0–1.5 | Several extend longer, beyond the blister. |
| 1.0–1.5 | Numerous smaller cracks observed. |
| 1.0–2.0 | Numerous cracks, but longer than above. |
| 2.33–4.0 | Most blisters cracked and extended longer. |
| 2.5–4.5 | Dense mix of larger domed and smaller perimeter. |
| 2.0–3.5 | Several extended domed cracks. |

Mudcracking, whereby dense cracking intersects one crack with other cracks, approaches the maximum possible and would be cause for failure.

Gloss: Most panels hold a high initial gloss and a loss of gloss is easily recognized. However, if the initial gloss is low a change may not be easily observed. Depending on the blistering, the gloss may even appear to have increased.

TABLE 2

Barrier Coat Description

|  | Comparative Sample B | Comparative Sample C | Comparative Sample D | Example 3 |
| --- | --- | --- | --- | --- |
| Gel Coat Thickness | 20 | 20 | 20 | 20 |
| Barrier Coat Thickness | 0 | 18 | 18 | 18 |
| Commercial Barrier Coat Base Resin | — | Dow Derakane 8084 | Interplastic | CCP Vinyl Ester |

TABLE 3

100 Hour Boiling Water Test Results

|  | Comparative Sample B | Comparative Sample C | Comparative Sample D | Example 3 |
| --- | --- | --- | --- | --- |
| Blisters | 3.2 | .5 | .3 | .1 |
| Color Change | .6 | 1.7 | .9 | .6 |
| Change of Fiber Prominence | 1.0 | 1.0 | .6 | .2 |
| Cracks | .4 | 0 | 0 | 0 |
| Loss of Gloss | 0 | .5 | 0 | .1 |
| Total | 4.2 | 3.7 | 1.8 | 1.0 |

As shown in Table 3, the barrier coat made with inventive low VOC vinylester resin (Example 3) provided the best overall performance in the boiling test and also provided the best performance in four out of the five categories.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A resin comprising the reaction product obtained by reacting a mixture comprising; (i) a diepoxide having at least two glycidyl ether epoxy groups; (ii) an unsaturated monocarboxylic acid; (iii) maleic anhydride; and, (iv) water, until substantially all of the epoxy groups react wherein the molar ratio of diepoxide: unsaturated monocarboxytic acid; maleic anhydride is 1:0.5 to 2.0:0.1 to 0.5, respectively.

2. The resin of claim 1 wherein at least about 50% of the reaction product is a linear monomer or dimer.

3. The resin of claim 1 wherein the diepoxide is the condensation product of an epichlorahydrin and a diol.

4. The resin of claim 3 wherein the diepoxide is the condensation product of epichlorahydrin and bisphenol-A.

5. The resin of claim 1 wherein the unsaturated monocarboxylic acid is acrylic acid or methacrylic acid.

6. The resin of claim 1 wherein the water is present in about stoichiometric ratio with the maleic anhydride.

7. The resin of claim 1 wherein the resin has a viscosity of less than 1200 cP measured at a shear of 500 $s^{-1}$ in styrene at 70% non-volatile matter.

* * * * *